United States Patent
Saripella

(10) Patent No.: US 10,838,053 B2
(45) Date of Patent: Nov. 17, 2020

(54) SYSTEM AND METHOD OF MEASURING BLADE CLEARANCE IN A TURBINE ENGINE

(71) Applicant: GENERAL ELECTRIC COMPANY, Schenectady, NY (US)

(72) Inventor: Sai Venkata Karthik Saripella, Hyderabad (IN)

(73) Assignee: General Electric Company, Schecnectady, NY (US)

( * ) Notice: Subject to any disclaimer, the term of this patent is extended or adjusted under 35 U.S.C. 154(b) by 323 days.

(21) Appl. No.: 16/026,617

(22) Filed: Jul. 3, 2018

(65) Prior Publication Data
US 2020/0011982 A1 Jan. 9, 2020

(51) Int. Cl.
*G01S 11/14* (2006.01)
*G01B 17/00* (2006.01)
*G01M 15/14* (2006.01)

(52) U.S. Cl.
CPC .............. *G01S 11/14* (2013.01); *G01B 17/00* (2013.01); *G01M 15/14* (2013.01)

(58) Field of Classification Search
CPC ........ G01S 11/14; G01M 15/14; G01B 17/00; G01B 21/16
See application file for complete search history.

(56) References Cited

U.S. PATENT DOCUMENTS

| 8,568,026 | B2 | 10/2013 | Gregory et al. |
| 9,026,273 | B2 | 5/2015 | Ziarno |
| 9,026,279 | B2 | 5/2015 | Ziarno |
| 9,026,336 | B2 | 5/2015 | Ziarno |
| 9,152,146 | B2 | 10/2015 | Ziarno |
| 9,350,319 | B2 | 5/2016 | Mitchell et al. |
| 9,766,161 | B2 | 9/2017 | Fouache |
| 9,816,897 | B2 | 11/2017 | Ziarno |
| 2018/0038238 | A1 | 2/2018 | Ribarov et al. |
| 2020/0011982 | A1* | 1/2020 | Saripella ............. G01S 11/14 |

FOREIGN PATENT DOCUMENTS

CN 110672055 A * 1/2020 ............ G01M 15/14

* cited by examiner

*Primary Examiner* — Daniel Pihulic
(74) *Attorney, Agent, or Firm* — Hanley, Flight and Zimmerman, LLC

(57) ABSTRACT

A system for measuring a gap between a moving and stationary component of a turbine engine. The system comprises a turbine engine having a core with compressor, combustor, and turbine sections in axial flow arrangement, with at least one rotating blade mounted to a shaft in the compressor and turbine sections and a stationary casing surrounding the at least one blade. At least one surface acoustic wave sensor mounted on one of the at least one blades or casing and generating an electromagnetic signal. An antenna in communication with the surface acoustic wave sensor for receiving the electromagnetic signal; and a computer system configured to receive the electromagnetic signal from the antenna and to convert the electromagnetic signal to a clearance value.

20 Claims, 4 Drawing Sheets

SYSTEM AND METHOD OF MEASURING BLADE CLEARANCE IN A TURBINE ENGINE

BACKGROUND OF THE INVENTION

Turbine engines, and particularly gas or combustion turbine engines, are rotary engines that extract energy from a flow of combusted gases passing through the engine onto a multitude of rotating turbine blades. There is a need for real-time measuring of the physical aspects of turbine engines such as blade clearance between the tip of a turbine engine blade and its surrounding casing.

BRIEF DESCRIPTION OF THE INVENTION

In one aspect, the present disclosure relates to a system for measuring a gap between a moving and stationary component of a turbine engine. The system comprises a turbine engine having a core with compressor, combustor, and turbine sections in axial flow arrangement, with at least one rotating blade mounted to a shaft in the compressor and turbine sections and a stationary casing surrounding the at least one blade. At least one surface acoustic wave sensor mounted on one of the at least one blades or casing and generating an electromagnetic signal. An antenna in communication with the surface acoustic wave sensor for receiving the electromagnetic signal; and a computer system configured to receive the electromagnetic signal from the antenna and to convert the electromagnetic signal to a clearance value.

In another aspect, the present disclosure relates to a method of measuring a gap between a moving component and a stationary casing of a turbine engine. The method comprises attaching at least one surface acoustic wave sensor to one of the moving component or the stationary casing, rotating the component, measuring a signal at the surface acoustic wave sensor; transmitting the signal from the surface acoustic wave sensor to a receiver in communication with a computer system; receiving the signal at the computer system; and converting the signal to a clearance value indicating a clearance between the moving component and the stationary casing.

DETAILED DESCRIPTION OF THE INVENTION

Figure 1:
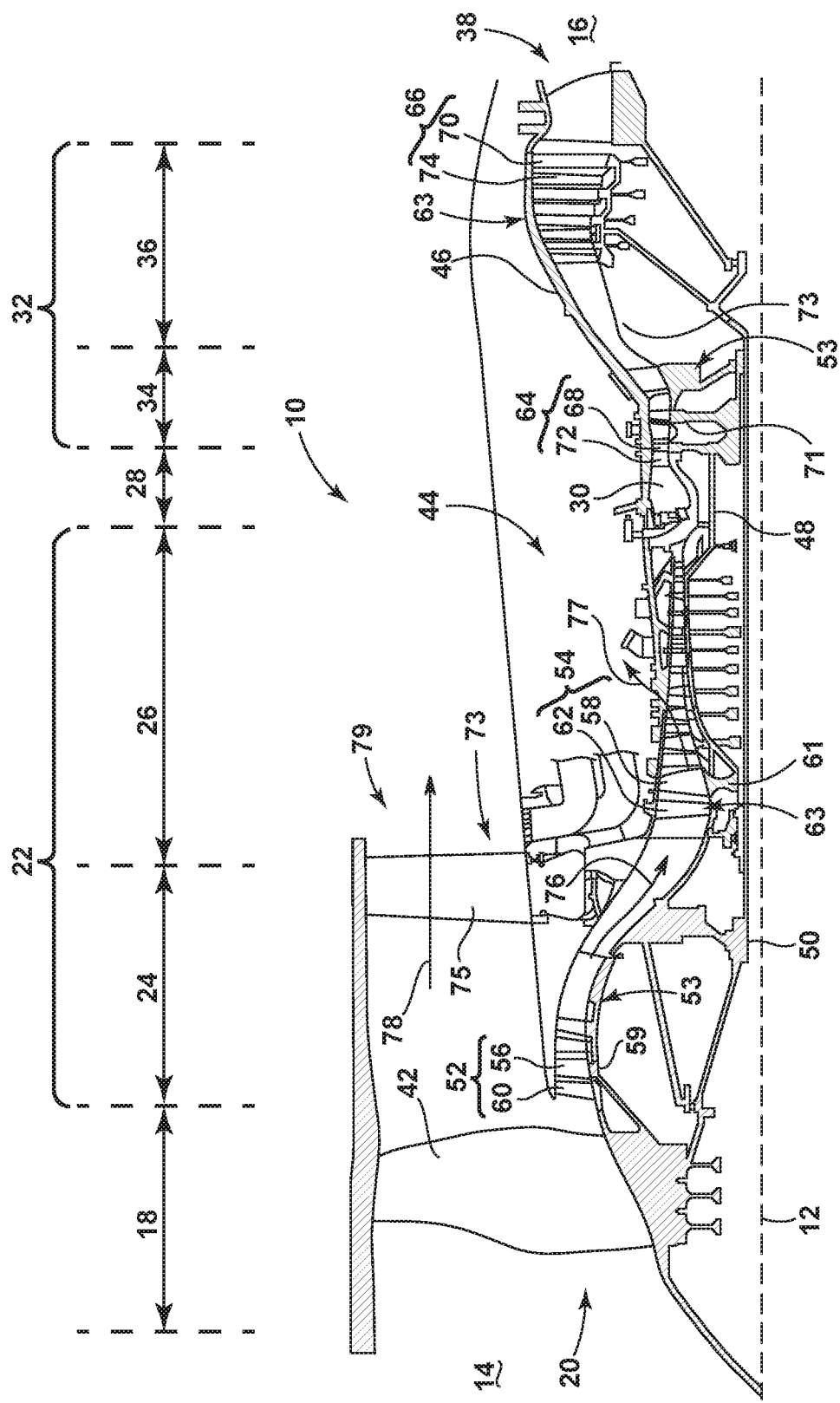
FIG. 1 is a schematic cross-sectional diagram of a gas turbine engine for an aircraft.

Aspects of the disclosure described herein are directed to the use of a self-powered clearance measurement system capable of measuring the clearance between the blades in a compressor or turbine sections of a turbine engine and the turbine engine casing. The system can measure the clearance by measuring the change in pressure as the gap between the blade and the casing narrows or widens. This differential pressure signals can be converted into electronic waves, which can then be processed by a computer system to get data or values in the form of clearance values.

For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 73, comprising a plurality of airfoil guide vanes 75, at the fan exhaust side 79. More specifically, a circumferential row of radially extending airfoil guide vanes 75 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2A:
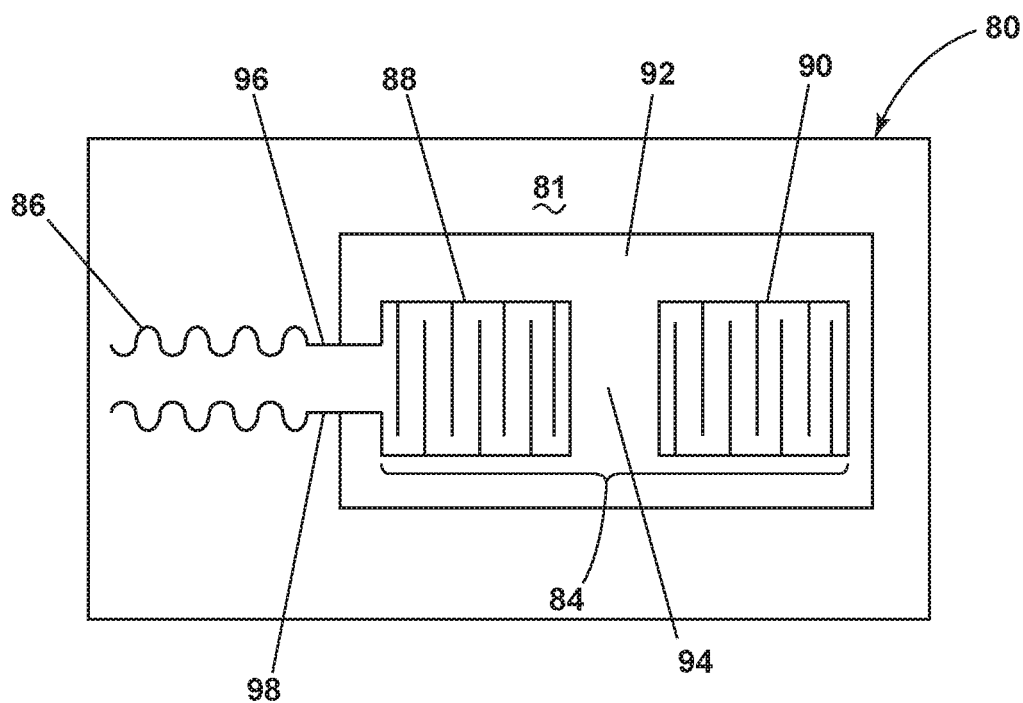
FIGS. 2a & 2b schematic views surface acoustic wave (SAW) sensors including a wireless delay SAW sensor and a wireless resonator SAW sensor, respectively.
Figure 2B:
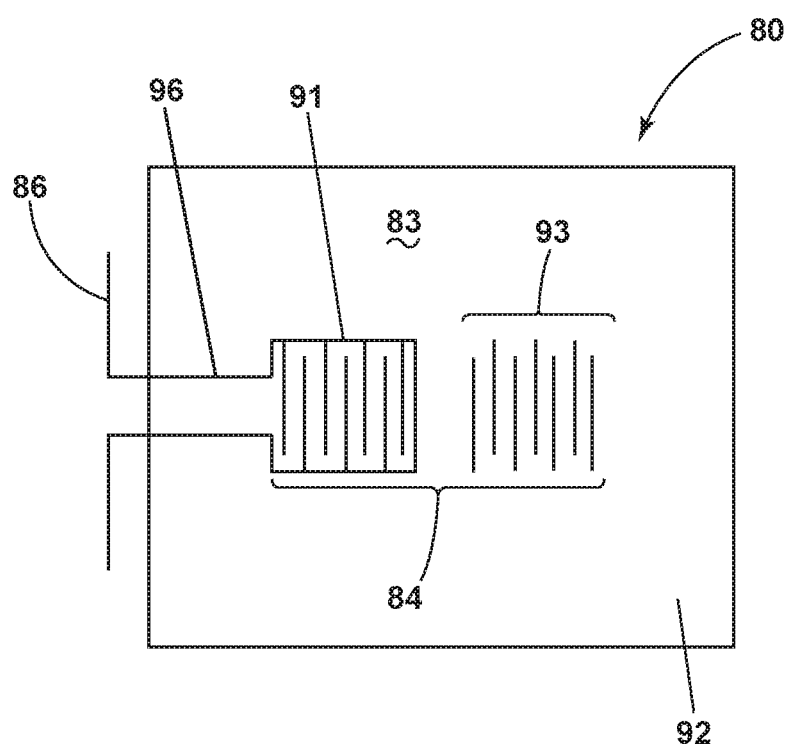

FIGS. 2a and 2b depict exemplary embodiments of a wireless passive acoustic wave sensor, otherwise known as a SAW sensor 80. SAW Sensor 80 can have different architectures such a as wireless delay SAW sensor 81 or a wireless resonator SAW Sensor 83. In either case, the SAW sensor 80 is built on a piezoelectric substrate 92 which works on the principal of Piezoelectric Effect. The SAW sensor 80 transduces an input electromagnetic wave that can be easily influenced by physical phenomena. The device then transduces this wave back into an electromagnetic signal. Changes between the input and output electromagnetic signals (phase, frequency, or amplitude) can be used to measure the changes in the desired phenomenon, such as a change in pressure.

In the specific embodiments shown in FIGS. 2a and 2b, the SAW sensor 80 can comprise a sensing element 84 and a transmission element 86, which may function as a transceiver to transmit and receive signals to and from the SAW sensor 80. The SAW sensor 80 can also include an input interdigital transducer 88 and/or an output interdigital transducer 90 formed on a piezoelectric substrate 92. For example, a typical delay line SAW sensor 81 includes both an input interdigital transducer 88 and an output interdigital transducer 90, while a typical resonator SAW sensor 83 contains an interdigital transducer 91, acting as both input and output transducer, with reflectors 93. As in a typical delay SAW sensor a line delay 94 or gap is between the transducers 88, 90. An important feature of SAW sensor 80 is the ability of the sensor to store energy. The SAW sensor 80 can then operate in isolation without any active part, i.e. without any power supply. Transmission element 86 connected to the input transducer 88 receives the signals and the input transducer 88, 91 converts them into surface acoustic waves on the piezoelectric substrate 92 and will cause the SAW sensor 80 to "store" the energy. The output transducer 90, 91 or reflectors 93 on the substrate reflect the modified surface acoustic waves to the input transducer 88 which then converts these modified surface acoustic waves to electromagnetic response signals emitted by the transmission element 86.

One or more electrical leads 96 provides electrical communication between the output transducer 90, 91 and the transmission element 86. The piezoelectric substrate 92 may be composed of a piezoelectric material that can function at temperature of up to about 1500° C. Some example piezoelectric substrates include Langasite (La3Ga5SiO14), Lithium Nio-bate (LiNbO3), berlinite (AlPO4), lithium tetraborate (Li2B4O7), and galliumorthophosphate (GaPO4). In addition, the input and output interdigital transducers 88, 90, 91 can be comprised of a series of interleaved electrodes made of a metal film deposited on the piezoelectric substrate 92. Other architecture of SAW sensors could also used to in accordance with the present disclosure.

Figure 3:
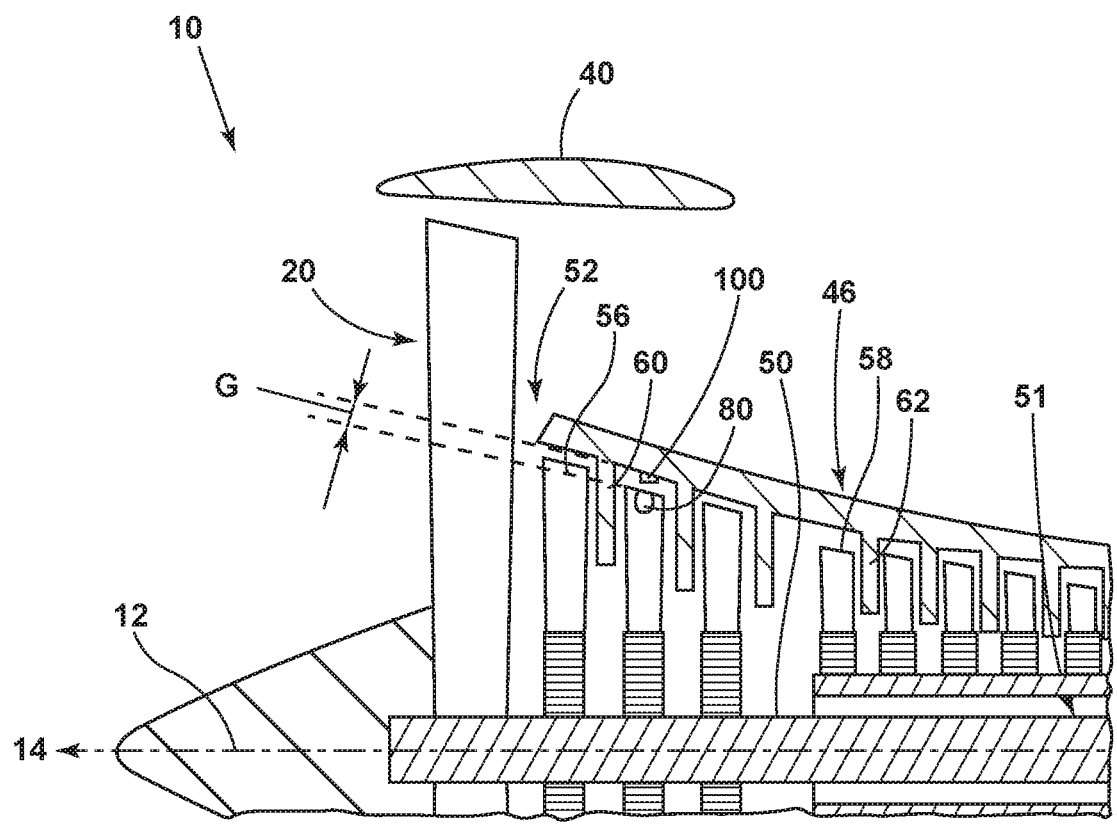
FIG. 3 is an illustration of an exemplary embodiment of the SAW sensor applied to a blade of the turbine engine of FIG. 1.

FIG. 3 depicts the use of a SAW sensor 80 on the blade 56 of turbine engine 10. In a typical situation the casing 46 of a turbine engine 10 is assembled and the SAW sensor 80 can be attached to the blade 56 through a boroscope hole used for inspecting components of the turbine engine 10. The SAW sensor 80 can be positioned at the end or tip of any given blade 56 at a point near of close to the casing 46. The SAW sensor 80 is used to measure the gap G between the tip of the blade 56 and the casing 46. The SAW sensor 80 can be attached to the blade 56 with glue, wax or other sticky or adhering substance. In an exemplary embodiment, it is contemplated the SAW sensor 80 can be removeably attached to the blade 56 so it can reused after testing or measuring is complete. The SAW sensor 80 can be removed through the borescope hole it was inserted through or it can be left on the blade 56 where it will be burnt off during performance testing.

As also illustrated in FIG. 3, a receiver 100 can be attached proximate the sensor 80, either inside or outside the casing 46. Like the SAW sensor 80, the receiver 100 is contemplated to be attached to the casing 46 with glue, wax or other sticky substance. The receiver 100 can be in wireless communication with the SAW sensor 80 for sending and receiving electromagnetic signals 126 to and from the SAW sensor 80.

Figure 4:
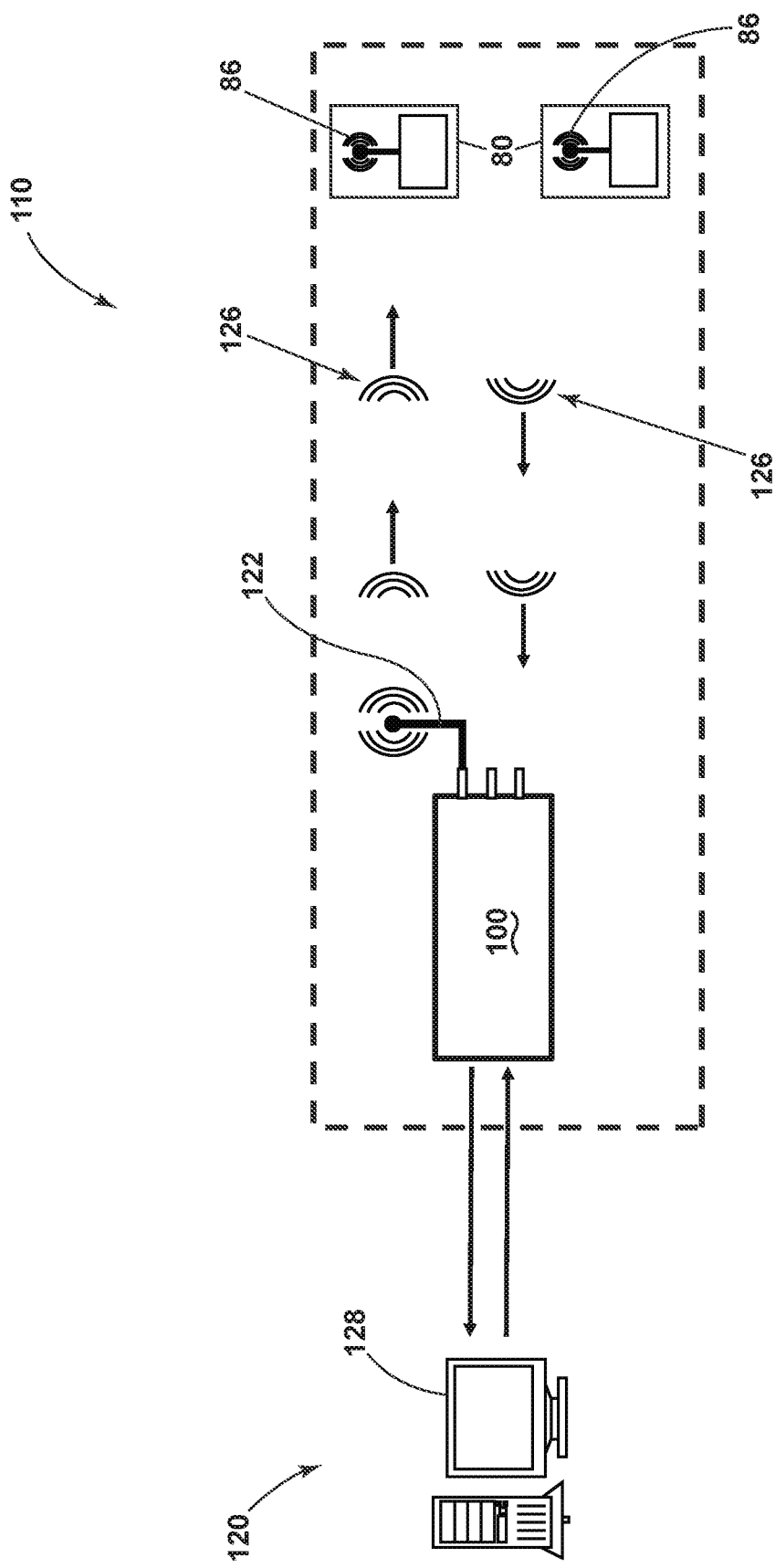
FIG. 4 is system for measuring the gap or clearance of the blade of FIG. 3 with a SAW sensor.

FIG. 4 depicts an exemplary system 110 for measuring the clearance or gap G between the blade 56 and the casing 46 as depicted in FIG. 3. The system 110 can include one or more SAW sensors 80, one or more receivers 100, and a computer system 120 for processing the electromagnetic signals 126. The receiver 100 can comprise an antenna 122 for transmitting electromagnetic signals to and from both the SAW sensor 80 and the computer system 120. The computer system 120 could be, for example, a Windows computing device, a Unix computing device, a Linux computing device, an Apple OSX computing device, an Apple iOS computing device, or an Android computing device. The computer system 120 can comprise logic, circuitry, interfaces and/or code that is operable to receive, convert, and manipulate the electromagnetic signals 126 from the SAW sensor 80. In the exemplary embodiment, the computer system 120 can be configured to receive the electromagnetic signals 126 from the SAW sensor 80 in the form of pressure values read by SAW sensor 80 and with executable code that is configured to convert the pressure values into clearance values for determining the clearance or gap G between a blade 56 and casing 46. The computer system 120 can be provided with graphical user interface 128 for displaying the real-time monitoring of the sensor electrical signals 126 and associated clearance values.

In operation, remote clearance sensing can be accomplished by the system 110 during all phases of turbine engine 10 use. Upon rotating the rotor 51, which turns the blade 56 relative to stationary casing 46, the computer system 120 can cause an electromagnetic signal 126 to be sent to the SAW sensor 80 via antenna 122. The electromagnetic signal 126 can be received by the input interdigital transducer 88, 91 and transduced into a mechanical or surface acoustic wave. The surface acoustic wave propagates along the surface of the piezoelectric substrate 92, where the wave can be modified by changes in its physical surroundings. The modification or variation in the acoustic wave imply changes in wave properties such as frequency or delay. The output interdigital transducer 90, 91 receives the modified acoustic waves and transduces the modified acoustic waves back into a modified electromagnetic signal. The modified electrical signal 126 reflects the changes made to wave while it was in mechanical wave form. The modified electromagnetic signal 126 can be transmitted back to the antenna 122 and onto the computer system 120 for processing. The computer system 120 translates the electromagnetic signal 126 into a clearance value reflective of gap G. The accuracy of the translated clearance gap G is typically within about 1 thousandths of an inch.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done so for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for measuring a gap between a moving and stationary component of a turbine engine comprising:
    a turbine engine having a core with compressor, combustor, and turbine sections in axial flow arrangement, with at least one rotating blade mounted to a rotor in the compressor and turbine sections and a stationary casing surrounding the at least one rotating blade;
    at least one surface acoustic wave sensor mounted on one of the at least one rotating blade or casing and generating an electromagnetic signal;
    an antenna in communication with the at least one surface acoustic wave sensor for receiving the electromagnetic signal; and
    a computer system configured to receive the electromagnetic signal from the antenna and to convert the electromagnetic signal to a clearance value.

2. The system of claim 1 wherein the surface acoustic wave sensor has a piezoelectric substrate comprising of one of Langasite (La3Ga5SiO14), Lithium Nio-bate (LiNbO3), berlinite (AlPO4), lithium tetraborate (Li2B4O7), and galliumorthophosphate (GaPO4).

3. The system of claim 1 wherein the computer system has a real-time monitoring graphical user interface.

4. The system of claim 1 wherein the at least one surface acoustic wave sensor is removably mounted at a tip of the at least one rotating blade.

5. The system of claim 4 wherein the at least one surface acoustic wave sensor is glued on the tip of the at least one rotating blade.

6. The system of claim 5 further comprising a receiver for sending and receiving electromagnetic signals to the at least one surface acoustic wave sensor.

7. The system of claim 6 wherein the receiver is mounted on the inside of the casing proximate the tip of the at least one rotating blade.

8. The system of claim 7 wherein the receiver is mounted on the outside of the casing.

9. The system of claim 7 wherein the receiver is glued to the inside of the casing.

10. The system of claim 1 wherein the at least one acoustic wave sensor receives an electromagnetic signal and transduces the electromagnetic signal to a mechanical wave signal.

11. The system of claim 10 wherein the mechanical wave signal measures change in pressure between a tip of the at least one rotating blade and the casing.

12. The system of claim 11 wherein the at least one surface acoustic wave sensor transduces the mechanical wave signal to a second electromagnetic wave signal.

13. A method for measuring a gap between a moving component and a stationary casing in a turbine engine comprising:
    attaching at least one surface acoustic wave sensor to one of the moving component or the stationary casing;
    rotating the component;
    measuring a signal at the at least one surface acoustic wave sensor;
    transmitting the signal from the at least one surface acoustic wave sensor to a receiver in communication with a computer system;
    receiving the signal at the computer system; and
    converting the signal to a clearance value indicating a clearance between the moving component and the stationary casing.

14. The method of claim 13 wherein the at least one surface acoustic wave sensor is removably attached at a tip of a blade.

15. The method of claim 14 wherein the tip of the blade is accessed through a borescope hole in the turbine engine.

16. The method of claim 14 wherein the at least one surface acoustic wave sensor is glued on the tip of the blade.

17. The method of claim 15 further comprising removing the at least one surface acoustic wave sensor through the borescope hole after completion.

18. The method of claim 13 further comprising removably attaching a receiver to other of the moving component or stationary casing for sending and receiving electromagnetic signals to the at least one surface acoustic waver sensor.

19. The method of claim 18 wherein the receiver is mounted on the inside of the casing proximate a tip of at least one blade.

20. The method of claim 19 wherein the receiver is glued to the inside of the casing.

* * * * *